US010700361B2

(12) United States Patent
Liu et al.

(10) Patent No.: US 10,700,361 B2
(45) Date of Patent: Jun. 30, 2020

(54) NANOFIBROUS ELECTROCATALYST INCLUDING NANOFIBROUS CONTINUOUS NETWORK OF GRAPHITIC NANOFIBERS HAVING EMBEDDED CATALYTICALLY ACTIVE METAL MOIETIES

(71) Applicant: UChicago Argonne, LLC, Chicago, IL (US)

(72) Inventors: Di-Jia Liu, Elmhurst, IL (US); Jianglan Shui, Darien, IL (US); Chen Chen, Darien, IL (US)

(73) Assignee: UChicago Argonne, LLC, Chicago, IL (US)

(*) Notice: Subject to any disclaimer, the term of this patent is extended or adjusted under 35 U.S.C. 154(b) by 247 days.

(21) Appl. No.: 15/144,650

(22) Filed: May 2, 2016

(65) Prior Publication Data

US 2016/0248102 A1 Aug. 25, 2016

Related U.S. Application Data

(62) Division of application No. 13/630,930, filed on Sep. 28, 2012, now Pat. No. 9,350,026.

(51) Int. Cl.
*H01M 4/90* (2006.01)
*H01M 12/08* (2006.01)
(Continued)

(52) U.S. Cl.
CPC ......... *H01M 4/9083* (2013.01); *C01B 32/158* (2017.08); *C01B 32/166* (2017.08);
(Continued)

(58) Field of Classification Search
CPC .. H01M 4/9083; H01M 4/382; H01M 4/9016; H01M 4/9041; H01M 4/926;
(Continued)

(56) References Cited

U.S. PATENT DOCUMENTS 4,800,188 A 1/1989 Shepherd
7,740,902 B2 6/2010 O'Brien et al.
(Continued)

FOREIGN PATENT DOCUMENTS

CN 102021677 A * 4/2011
JP 2012-033320 A 2/2012
(Continued)

OTHER PUBLICATIONS

Kim et al., Self-Sustained Thin Webs Consisting of Porous Carbon Nanofibers for Supercapacitors via the Electrospinning of Polyacrylonitrile Solutions Containing Zinc Chloride, 2007, Advanced Materials, 19, 2341-2346 (Year: 2007).*
(Continued)

*Primary Examiner* — Sean P Cullen
(74) *Attorney, Agent, or Firm* — Foley & Lardner LLP

(57) ABSTRACT

A nanofibrous catalyst and method of manufacture. A precursor solution of a transition metal based material is formed into a plurality of interconnected nanofibers by electrospinning the precursor solution with the nanofibers converted to a catalytically active material by a heat treatment. Selected subsequent treatments can enhance catalytic activity.

19 Claims, 10 Drawing Sheets

(51) Int. Cl.

| | |
|---|---|
| *C01B 32/166* | (2017.01) |
| *C01B 32/158* | (2017.01) |
| *H01M 2/16* | (2006.01) |
| *H01M 4/38* | (2006.01) |
| *H01M 4/92* | (2006.01) |
| *H01M 8/02* | (2016.01) |
| *H01M 8/0263* | (2016.01) |
| *H01M 8/1004* | (2016.01) |
| *H01M 8/1018* | (2016.01) |
| *H01M 8/1023* | (2016.01) |
| *H01M 8/1039* | (2016.01) |
| *H01M 10/0525* | (2010.01) |
| *H01M 10/0568* | (2010.01) |
| *H01M 10/0569* | (2010.01) |
| *B82Y 30/00* | (2011.01) |
| *B82Y 40/00* | (2011.01) |
| *H01M 4/88* | (2006.01) |
| *H01M 10/0585* | (2010.01) |
| *H01M 4/02* | (2006.01) |
| *H01M 4/86* | (2006.01) |

(52) U.S. Cl.
CPC ......... *H01M 2/1613* (2013.01); *H01M 4/382* (2013.01); *H01M 4/9016* (2013.01); *H01M 4/9041* (2013.01); *H01M 4/926* (2013.01); *H01M 8/02* (2013.01); *H01M 8/0263* (2013.01); *H01M 8/1004* (2013.01); *H01M 8/1018* (2013.01); *H01M 8/1023* (2013.01); *H01M 8/1039* (2013.01); *H01M 10/0525* (2013.01); *H01M 10/0568* (2013.01); *H01M 10/0569* (2013.01); *H01M 12/08* (2013.01); *B82Y 30/00* (2013.01); *B82Y 40/00* (2013.01); *H01M 4/8828* (2013.01); *H01M 10/0585* (2013.01); *H01M 2004/027* (2013.01); *H01M 2004/8684* (2013.01); *H01M 2004/8689* (2013.01); *H01M 2008/1095* (2013.01); *H01M 2300/0028* (2013.01); *Y02E 60/128* (2013.01)

(58) Field of Classification Search
CPC .... H01M 8/02; H01M 8/0263; H01M 8/1004; H01M 8/1018; H01M 8/1023; H01M 8/1039; H01M 10/0525; H01M 10/0568; H01M 10/0569; H01M 12/08; C01B 32/158; C01B 32/166
USPC .................................. 429/236, 527, 533, 534
See application file for complete search history.

(56) References Cited

U.S. PATENT DOCUMENTS

| | | | |
|---|---|---|---|
| 2006/0002844 A1* | 1/2006 | Suenaga ................ | B82Y 30/00 423/447.3 |
| 2006/0019819 A1* | 1/2006 | Shao-Horn .......... | D01D 5/0038 502/4 |
| 2007/0134151 A1* | 6/2007 | Jo ........................ | D01D 5/0007 423/448 |
| 2009/0081391 A1 | 3/2009 | Mei et al. | |
| 2010/0323272 A1* | 12/2010 | Ozaki ...................... | B01J 21/18 429/484 |
| 2011/0012296 A1* | 1/2011 | Nakanichi .............. | B82Y 30/00 264/484 |
| 2011/0052467 A1 | 3/2011 | Chase et al. | |
| 2011/0171565 A1 | 7/2011 | Birkan et al. | |
| 2012/0077667 A1 | 3/2012 | Liu et al. | |
| 2012/0198769 A1 | 8/2012 | Schirrmeister et al. | |
| 2013/0122391 A1 | 5/2013 | Sasaki et al. | |
| 2013/0137001 A1 | 5/2013 | Zhang et al. | |
| 2014/0072700 A1* | 3/2014 | Kim ........................ | D01F 1/10 427/77 |

FOREIGN PATENT DOCUMENTS

| | | | | |
|---|---|---|---|---|
| WO | WO-2012014768 A1 * | 2/2012 | .......... | H01M 4/8605 |
| WO | WO-2012/074160 | 6/2012 | | |

OTHER PUBLICATIONS

Ji et al., Porous carbon nanofibers from electrospun polyacrylonitrile/$SiO_2$ composites as an energy storage material, 2009, Carbon, 47, 3346-3354 (Year: 2009).*

Ji et al., Porous carbon nanofiber-sulfur composite electrodes for lithium/sulfur cells, Oct. 18, 2011, Energy and Environmental Science, 4, 5053-5059 (Year: 2011).*

Cavaliere et al., Electrospinning: designed architectures for energy coversion and storage devices, Oct. 2011, Energy & Environmental Science, 4, 4761-4785 (Year: 2011).*

Biddinger, Elizabeth J., et al., Nitrogen-Containing Carbon Nanostructures as Oxygen-Reduction Catalysts, Topics in Catalysis vol. 52 Issue 11, Oct. 2009, pp. 1566-1574.

Goifman, Anatoly, et al. Catalytic Oxidation of Thiol Compounds by Novel Fuel Cell-inspired Co-Porphyrin and Co-Imidazole Catalysts, Israel Journal of Chemistry 46.1, Jun. 2006, pp. 17-26.

Huang, et al., A Review on Polymer Nanofibers by electrospinning and Their Applications in Nanocomposites, Composites Science and Technology, Apr. 8, 2003, pp. 2223-2253, vol. 63, Elsevier Ltd.

U.S. Notice of Allowance for U.S. Appl. No. 13/630,930, dated Jan. 22, 2016, 8 pages.

U.S. Office Action for U.S. Appl. No. 13/630,930, dated Mar. 20, 2015, 17 pages.

U.S. Office Action for U.S. Appl. No. 13/630,930, dated Oct. 24, 2014, 11 pages.

U.S. Office Action for U.S. Appl. No. 13/630,930, dated Aug. 14, 2015, 9 pages.

Yang, et al., Aligned Carbon Nanotubes with Built-In $FeN_4$ Active Sites for Electrocatalytic Reduction of Oxygen, Chem Commun., Nov. 29, 2007, pp. 329-331, The Royal Society of Chemistry.

Abraham & Jiang, "A Polymer Electrolyte-Based Rechargeable Lithium/Oxygen Battery," Journal of the Electrochemical Society 143(1), pp. 1-5 (1996).

Andrei, et al., "Some Possible Approaches for Improving the Energy Density of Li-Air Batteries," Journal of the Electrochemical Society 157(12), pp. A1287-A1295 (2010).

Bruce, et al., "Lithium-air and lithium-sulfur batteries," MRS Bulletin 36(7), pp. 506-512 (2011).

Chen, et al., "Atomic Layer Deposition to Fine-Tune the Surface Properties and Diameters of Fabricated Nanopores," Nano Letters 4(7), pp. 1333-1337 (2004).

Chen, et al., "The Role of Transition Metal Interfaces on the Electronic Transport in Lithium-Air Batteries," Catalysis Today 165(1), pp. 2-9 (2011).

Christensen, et al., "Controlled growth of platinum nanoparticles on strontium titanate nanocubes by atomic layer deposition," Small 5(6), pp. 750-757 (2009).

Chung, et al., "Preparation of Analyses of $MnO_2$/Carbon Composites for Rechargeable Lithium-Air Battery," Reviews on Advanced Materials Science 28, pp. 54-58 (2011).

Debart, et al., "$\alpha$-$MnO_2$ Nanowires: A Catalyst for the $O_2$ Electrode in Rechargeable Lithium Batteries," Angewandte Chemie 47(24), pp. 4521-4524 (2008).

Elam, et al., "Viscous flow reactor with quartz crystal microbalance for thin film growth by atomic layer deposition," Review of Scientific Instruments 73(8), pp. 2981-2987 (2002).

Eswaran, et al., "High Capacity Li—$O_2$ Cell and Electrochemical Impedance Spectroscopy Study," Electrochemical and Solid-State Letters 13(9), pp. A121-A124 (2010).

Feng, et al., "Palladium catalysts synthesized by atomic layer deposition for methanol decomposition," Chemistry of Materials 22(10), pp. 3133-3142 (2010).

Figueroa, et al., "Thermal Evolution of Pt-Rich FePt/$Fe_3O_4$ Heterodimers Studied Using X-Ray Absorption Near Edge Spectroscopy," The Journal of Physical Chemistry C 115(13), pp. 5500-5508 (2011).

(56) References Cited

OTHER PUBLICATIONS

Girishkumar, et al., "Lithium-Air Battery: Promise and Challenges," Journal of Physical Chemistry Letters 1(14), pp. 2193-2203 (2010).

Herrera, et al., "Synthesis, characterization, and catalytic function of novel highly dispersed tungsten oxide catalysts on mesoporous silica," Journal of Catalysis 239(1), pp. 200-211 (2006).

Hummelshoj, et al., "Communications: Elementary oxygen electrode reactions in the aprotic Li-air battery," The Journal of Chemical Physics 132, 071101, 5 pages (2010).

Jiang, et al., "Application of Atomic Layer Deposition of Platinum to Solid Oxide Fuel Cells," Chemistry of Materials 20(12), pp. 3897-3905 (2008).

Jiao & Bruce, "Mesoporous Crystalline beta-MnO2-a Reversible Positive Electrode for rechargeable Lithium Batteries," Advanced Materials 19, pp. 657-660 (2007).

Keranen, et al., "Preparation, characterization and activity testing of vanadia catalysts deposited onto silica and alumina supports by atomic layer deposition," Applied Catalysis A: General 228, pp. 213-225 (2002).

Kuboki, et al., "Lithium-air batteries using hydrophobic room temperature ionic liquid electrolyte", Journal of Power Sources 146, pp. 766-769 (2005).

Laoire, et al., "Rechargeable Lithium/TEGDME-LiPF6/O2 Battery," Journal of the Electrochemical Society 158(3), pp. A302-A308 (2011).

Laoire, et al., "Elucidating the mechanism of oxygen reduction for lithium-air battery applications," The Journal of Physical Chemistry C 113 (46), pp. 20127-20134 (2009).

Lei, et al., "Increased silver activity for direct propylene epoxidation via subnanometer size effects," Science 328(5975), pp. 224-228 (2010).

Leskela & Ritala, "Atomic layer deposition (ALD): from precursors to thin film structures," Thin Solid Films 409(1), pp. 138-146 (2002).

Lu & Stair, "Low-temperature ABC-type atomic layer deposition: synthesis of highly uniform ultrafine supported metal nanoparticles," Angewandte Chemie 49, pp. 2547-2551 (2010).

Lu & Stair, "Nano/Subnanometer Pd Nanoparticles on Oxide Supports Synthesized by AB-type and Low-Temperature ABC-type Atomic Layer Deposition: Growth and Morphology," Langmuir 26(21), pp. 16486-16495 (2010).

Lu, "The Influence of Catalysts on Discharge and Charge Voltages of Rechargeable Li-Oxygen Batteries," Electrochemical and Solid-State Letters 13(6), pp. A69-A72 (2010).

Lu, et al., "Platinum-Gold Nanoparticles: A Highly Active Bifunctional Electrocatalyst for Rechargeable Lithium-Air Batteries," Journal of the American Chemical Society 132(35), pp. 12170-12171 (2010).

Lu, et al., "Electrocatalytic Activity Studies of Select Metal Surfaces and Implications in Li-Air Batteries," Journal of the Electrochemical Society 157(9), pp. A1016-A1025 (2010).

Lu, et al., "Method Development to Evaluate the Oxygen Reduction Activity of High-Surface-Area Catalysts for Li-Air Batteries," Electrochemical and Solid-State Letters 14(5), pp. A70-A74 (2011).

Ogasawara, et al., "Rechargeable Li2O2 Electrode for Lithium Batteries", Journal of the American Chemical Society 128(4), pp. 1390-1393 (2006).

Pellin, et al., "Mesoporous catalytic membranes: Synthetic control of pore size and wall composition," Catalysis Letters 102(3-4), pp. 127-130 (2005).

Ren, et al., "Oxygen reduction reaction catalyst on lithium/air battery discharge performance," Journal of Materials Chemistry 21, pp. 10118-10125 (2011).

Shao, et al., "Structural dependence of oxygen reduction reaction on palladium nanocrystals," Chemical Communications 47, pp. 6566-6568 (2011).

Shin, et al., "Formation of TiO2 and ZrO2 nanotubes using atomic layer deposition with ultraprecise control of the wall thickness," Advanced Materials 16, pp. 1197-1200 (2004).

Thapa, et al., "Pd / MnO2 Air Electrode Catalyst for Rechargeable Lithium/Air Battery," Electrochemical and Solid-State Letters 13(11), pp. A165-A167 (2010).

Wang & Zhou, "To draw an air electrode of a Li-air battery by pencil," Energy & Environmental Science 4, pp. 1704-1707 (2011).

Wang, et al., "High Capacity Pouch-Type Li-Air Batteries," Journal of the Electrochemical Society 157(7), pp. A760-A764 (2010).

Williford & Zhang, "Air Electrode Design for Sustained High Power Operation of Li/air Batteries," Journal of Power Sources 194, pp. 1164-1170 (2009).

Xiao, "Optimization of Air Electrode for Li/Air Batteries," Journal of the Electrochemical Society 157(4), pp. A487-A492 (2010).

Xu, et al., "Reaction Mechanisms for the Limited Reversibility of Li—O2 Chemistry in Organic Carbonate Electrolytes," Journal of Power Sources 196(22), pp. 9631-9639 (2011).

Xu, et al., "Effects of Nonaqueous Electrolytes on Primary Li-Air Batteries," Journal of the Electrochemical Society 157(2), pp. A219-A224 (2010).

Zhang, et al., "Air Dehydration Membranes for Nonaqueous Lithium-Air Batteries," Journal of the Electrochemical Society 157(8), pp. A940-A946 (2010).

Zhang, et al., "α-MnO2/Buckypaper Composite Catalytic Air Electrodes for Rechargeable Lithium-air Batteries," Journal of the Electrochemical Society 158(7), pp. A822-A827 (2011).

\* cited by examiner

NANOFIBROUS ELECTROCATALYST INCLUDING NANOFIBROUS CONTINUOUS NETWORK OF GRAPHITIC NANOFIBERS HAVING EMBEDDED CATALYTICALLY ACTIVE METAL MOIETIES

CROSS-REFERENCE TO RELATED PATENT APPLICATIONS

This application is a Divisional of U.S. application Ser. No. 13/630,930, filed Sep. 28, 2012, incorporated herein by reference in its entirety.

GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates generally to the field of catalysts. More particularly the invention relates to nanofibrous electrocatalysts and methods of manufacture. In addition, the invention relates to a fabric catalyst and method of preparation where the fibers have nanometer dimensions providing enhanced catalytic performance, particularly for proton exchange membrane fuel cell and lithium-air battery applications.

BACKGROUND OF THE INVENTION

The current invention discloses a method of preparing a fabric electrode catalyst with diameters of the fibers having nanometer dimensions. Such nanofiber catalysts can be used in proton exchange membrane fuel cell (PEMFC) and Li-air battery (LAB) applications.

A proton exchange membrane cell ("PEMFC") is an effective device for energy conversion applications. A PEMFC can convert chemical energy to electric energy through the electro-catalytic reactions. The PEMFC operates at a relatively low temperature with the gas phase hydrogen used as fuel and oxygen (air) used as an oxidant. Due to its high conversion efficiency, low noise and low emissions, a PEMFC is deemed to have high potential in the areas of automobile and distributed power generation.

At the core of a PEMFC is the membrane electrode assembly ("MEA") which includes an anode, a cathode and a polymer electrolyte layer disposed therebetween. At the surface of the anode, hydrogen is oxidized to protons through an electro-catalytic process, $$H_2 \rightarrow 2H^+ + 2e^- \quad (1)$$

The protons thus produced are transported to the cathode side of the cell through a proton conductive membrane. At the surface of the cathode, oxygen is electro-catalytically reduced and subsequently reacts with protons in accordance with equation (1) to form water, $$O_2 + 4e^- - 4H^+ \rightarrow 2H_2O \quad (2)$$

Equation (2) is also known as the oxygen reduction reaction ("ORR"). The reactions of Equations (1) and (2) occur on the surface of electrode catalysts. At present, the most effective catalyst for these reactions are made of platinum supported on amorphous carbon. A typical Pt loading on MEA surface ranges from 0.2 mg/cm² to 0.4 mg/cm². Since platinum is a precious metal with very limited supply, its usage adds a significant cost to a PEMFC system. Other platinum group metals ("PGMs"), such as Pd, Rh, Ru, are also being evaluated as a replacement for Pt. They too, suffer from the same issues as high cost and limited reserves. There is thus a strong need to find low cost materials as non-PGM catalysts to replace the usage of PGM materials to lower the overall cost of fuel cell systems.

A rechargeable Li-air battery represents another important electrochemical device that has high energy storage density and potentially high conversion efficiency. A LAB can be generally divided into three key components; an anode and a cathode separated by an electrolyte layer or membrane. The anode is made of lithium metal which exchanges between the ionic and metallic states during the discharge/charge processes. The electrochemical process occurring at the anode surface can be described simply by the following reversible equation:

$$Li \rightarrow Li^+ + e \quad (3)$$

The $Li^+$ ion thus formed will be shuttled back and forth between and the anode and cathode through a lithium ion conducting electrolyte membrane during the discharging-charging cycle. For an aprotic LAB, the oxygen is electro-catalytically reduced to oxide ions during the discharging cycle and re-oxidized back to gaseous $O_2$ during the charging cycle (oxygen evolution reaction, or "OER") at the cathode catalyst surface through a reversible interaction with $Li^+$ ion according to the following reaction:

$$O_2 + 2e^- + 2Li^+ \leftrightarrow Li_2O_2 \quad (4)$$

The equation (4) is generally called as the oxygen reduction reaction (ORR) for the forward reactions and oxygen evolution reaction (OER) for the reverse reactions, respectively.

At present, there exist a number of technical challenges facing LAB development. The first is the electric energy efficiency for the discharge-charge cycle. The discharging voltage of a LAB is directly affected by the kinetic barrier therefore the overpotential of the forward reaction in (4). Similarly, the barrier of the reverse reaction of Equation (4) influences the charging overpotential, and therefore the voltage. An effective catalyst in the LAB cathode can decrease both discharging and charging overpotentials, thereby improving the electric conversion efficiency. The current cathode catalysts for LAB are typically made of metal oxides supported on high surface area amorphous carbons. Such carbons can often be electrochemically oxidized under cathode environment. Furthermore, porous amorphous carbons often limit the interaction between oxygen and the electrolyte with the catalyst due to lack of sufficient triple-phase boundary and poor mass transfer. Consequently, there is a substantial need for an improved catalyst to remedy these problems.

In typical PEMFC applications, a cathodic oxygen reduction reaction, such as that described by Equation 2 provide hereinbefore, typically occurs at the catalyst surface of platinum supported by amorphous carbons, such as Pt/C. Few catalyst metals were found to have a comparable catalytic efficiency to that of platinum for the ORR. Those found with similar catalytic activity usually are in the precious group metals ("PGM"), such as Pd, Rh, Ir, Ru, in addition to Pt. The PGMs generally carry a high price due to limited reserves worldwide. The use of PGMs for an electrochemical device, such as a fuel cell, add significant cost to the system which therefore creates major barriers for commercialization. It is thus highly desirable to find low cost alternatives to PGMs as the electrode catalyst for fuel cell and similar electrocatalytic applications.

There have been many attempts to identify the replacements for PGMs, mainly through materials involving the transition metal compounds. For example, it has been known that the molecules containing a macrocyclic structure with an iron or cobalt ion coordinated by nitrogen from the four surrounding pyrrolic rings have the catalytic activity to capture and to reduce molecular oxygen. It has been demonstrated in the prior art that ORR catalytic activity can be further improved for such systems containing coordinated $FeN_4$ and $CoN_4$ macrocycles if they have been heat-treated. Recent prior art experiments have shown a similar method of making amorphous carbon based catalyst with good ORR activity by mixing macromolecules with $FeN_4$ group and carbonaceous material or synthetic carbon support, followed by high temperature treatment in the gas mixture of ammonia, hydrogen and argon. A prior art US patent has discussed a method of preparing non-PGM catalyst by incorporating transition metals to heteroatomic polymers in the polymer/carbon composite, and also this art considered a method to improve the activity of polymer/carbon composite by heat-treating the composite at elevated temperature in an inert atmosphere of nitrogen. Other prior art has reported another route of making porous non-PGM electrode catalyst using metal-organic framework material as precursors. Such an approach was later expanded by using an organometallic complex impregnated MOF system. The electrode catalysts prepared through these prior methods are generally in the form of powdered materials. To compensate for the relativity low catalytic activity on single catalytic site in comparison with that of precious metals, more catalyst materials are generally required to prepare fuel cell membrane electrode of the same geometric area. More materials often result in a thicker cathode and hence poorer mass transfer, which is undesirable in PEMFC cathode applications where maximum exposure of oxygen and effectively removing water are critical to the cell performance. To circumvent such issues, nanostructured materials, such as functionalized carbon nanotubes, have been evaluated as non-PGM catalyst to improve the mass/electron transports. For example, it has been demonstrated that Fe/N decorated aligned carbon nanotube could serve as the electrode catalyst for PEMFC. To decorate carbon nanotube (CNT) with a non-PGM catalytic site either through direct synthesis or via post-addition has some significant limitations. For example, a chemical vapor deposition (CVD) step is typically used for direct synthesis of CNT. The CVD mixture must to be vaporized first before decomposition during the CNT formation. Such a requirement limits the types of precursors that can be used to functionalize CNT. Furthermore, forming active site through nanotube growth is not an effective method of integrating high concentration atomic nitrogen into the graphitic layer as part of the catalytic center therefore cannot build highly active catalyst. Adding N-containing transition metal organometallic compound on the preformed CNT surface is another approach to fabricate the catalyst with nano-tubular structure. Such a compound can only be applied on the outer surface of the CNT which again limits the density of the catalytic active site. Furthermore, only the organometallic compounds soluble to the solvent compatible to the CNT can be used in such approach, which again greatly limits the choice of the precursors in improving the catalytic performance.

For the LAB application, ORR and OER occur over the cathode surface during discharging and charging step, respectively. At present, various catalysts including transition metal oxide and precious metals have been used and supported by the carbon materials. Such carbons can be amorphous or graphitic, but in general are randomly agglomerated without ordered nano-architecture. Since the cathode reactions in LAB occur between the interfaces of liquid electrolyte, solid catalyst and gaseous oxygen, maximal mass transfer and interaction are difficult to establish through such a random arrangement, which is similar to the cathodic process in PEMFC. In addition, solid precipitates such as lithium oxides are expected to form and decompose during discharge/charge cycle. Such precipitates can be deposited over the exterior surface of the carbon support, blocking the pores and thereby the access of electrolyte and oxygen into the catalysts inside of the pores. Consequently, many problems remain to be solved.

SUMMARY OF THE INVENTION

A method is provided for preparing a new class of electrode catalyst to promote the oxygen reduction reaction and oxygen evolution reaction at the cathode of a PEMFC or LAB. These electrode catalysts are preferably in the form of fabric structures containing a low level of transition metal and nitrogen embedded in a carbon fiber matrix. Alternatively, the structure contains a transition metal oxide evenly dispersed over the carbon fiber matrix. The carbon fibers are in the nanometer dimension range and can be solid or hollow, with optional holes on the surface. Such nanofibrous electrode catalysts have advantages of promoting mass transport between the reactant and catalyst site through a porous framework. The catalyst also improves thermal and electronic transfers through carbon fiber network with minimum percolation induced resistance. They also can enhance catalyst stability against oxidative corrosion through graphitic and low space curvature support and also reduce the cost by eliminating the usage of precious metal material. In PEMFC applications, such catalytically functionalized fibers can serve as the cathode catalyst to promote the oxygen reduction reaction and with high current density and durability. In LAB applications, such catalysts can also improve efficiency by reducing charge/discharge overpotentials and cycling stability.

One advantageous aspect of the current invention is the formulation of the electrospinning precursor solution for the production of a low cost, nanofibrous electrode catalyst. The compositions include transition metal compounds, either in the form of organometallics, metal organic framework or inorganic salt, with an optional organic ligand for chelating, the soluble fiber forming polymer and solvent with metal. All the components are mixed into a solution, and such solutions are suitable to fabricate nano-fibers through an electro-spinning approach.

Another aspect of the current invention is the formulation of the electrospinning precursor solution for the production of a porous nanofibrous electrode catalyst. The compositions include transition metal compounds, either in the form of organometallics, metal organic framework, inorganic salt or metal oxide, with an optional organic ligand for chelating with metal, and placing the soluble fiber-forming polymer, solvent, and pore-forming reagent into a solution. All the components are mixed into a solution and such a solution is suitable to fabricate porous nano-fiber through the electro-spinning approach.

Yet another aspect of the current invention is to produce the nano-fibers from the precursor solution using an electro-spinning method. The nanofibers are generated under a controlled electric field between the injector nozzle and collector plate and a controlled injection feed-rate.

A further aspect of the current invention is to thermally activate the prepared nanofibers to convert them from polymeric to carbonaceous materials through a high temperature treatment, such as pyrolysis in an inert or reducing atmosphere. Such a treatment leads to decomposition of transition metal compounds and nitrogen containing organic compounds; and reactions between different components within the mixture form the catalytic active site on the nanofibers. Such a treatment will also generate additional pores around nanofibers after decomposing the pore-forming reagent and further produce a higher surface area and exposure of the catalytic site. Furthermore, such an activation process will also improve the electronic conductivity because it converts the organic components to more conductive carbonaceous material which is important for the electrode catalyst.

An additional aspect of the current invention is to further process thermally activated nanofibers with the post-treatment methods including an acid wash, ball milling and second thermal treatment in the inert gas or in the presence of ammonia. Such a post-treatment method can further enhance the catalyst activity.

Another aspect of the current invention is to prepare a cathode layer of a membrane electrode assembly ("MEA") using ink mixed with the activated nanofiber as catalyst, which can be an ion-conducting polymer solution, such as Nafion ionomer solution. Such an MEA can be assembled in a PEMFC to convert chemical energy to electric energy.

A further aspect of the current invention is to prepare a catalyst layer using ink mixed with the activated nanofiber with or without transition metal oxide as a catalyst and a polymer binder. Such a catalyst layer can be used as the cathode in a rechargeable LAB.

DETAILED DESCRIPTION OF PREFERRED EMBODIMENTS

Figure 1:
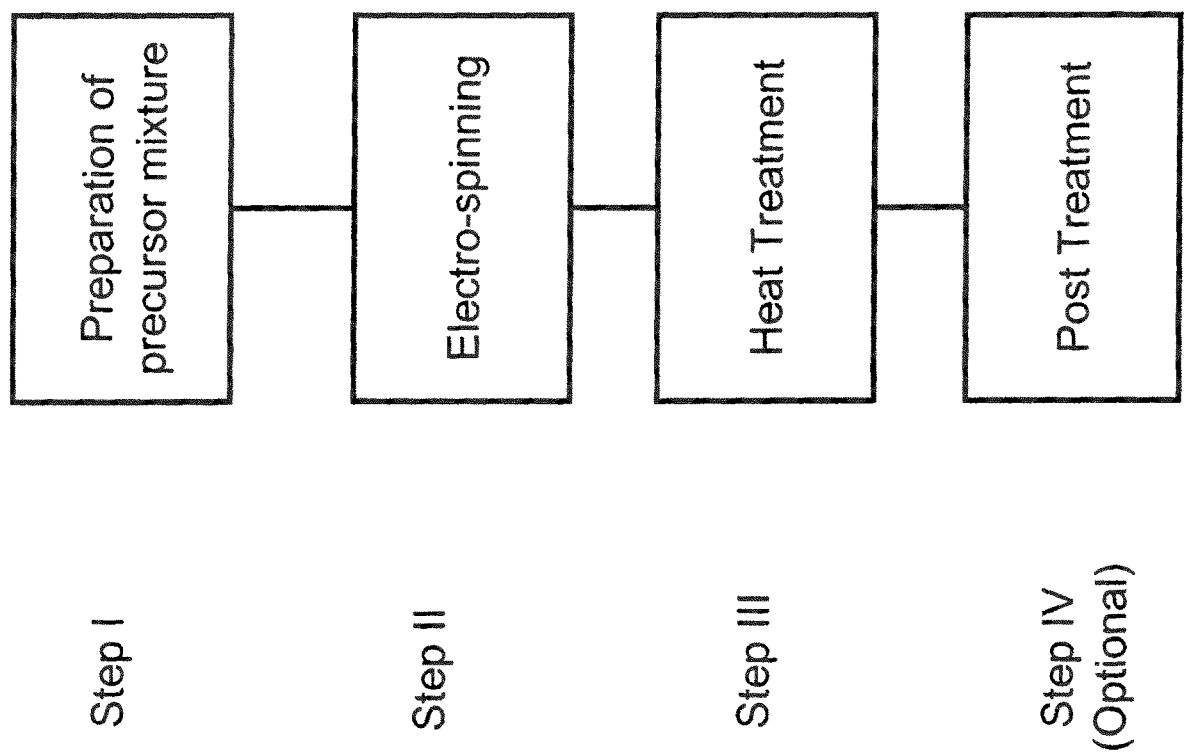
FIG. 1 shows a process flow chart for preparing nanofibrous non-PGM electrode catalyst for PEM fuel cell and the lithium-air battery applications.

In a preferred method of the invention nitrogen- and carbon-containing nanofibrous electrode catalysts are prepared by embedding with a transition metal or transition metal oxide, but free of platinum group metals. The materials are prepared according to the process flow chart shown in FIG. 1, and as described by the following steps; I) preparing the precursor solution containing transition metal based active ingredient, either in soluble form or solid, fiber-forming polymer, optional pore-forming polymer, and solvent; II) forming nanofibers using the electrospinning method with the precursor solution prepared in step I; III) converting the nanofibers from non-active polymeric form to a catalytically active carbonaceous form through heat-treatment at elevated temperature; and IV) further improving electrocatalytic activity of the nanofibrous catalysts from step III with additional chemical treatment. The details of each step are described hereinafter:

Preparing a precursor solution mixture in step I, according to one embodiment of the current invention, involves use of a precursor solution which preferably contains three components: the catalytic precursor that can be converted to catalytic active site after thermal treatment, a polymer to form the backbone of the nanofibrous carbon after activation, an optional polymer to form nanopores over the nanofiber, an optional organic ligand to coordinate with the transition metal to new metal-ligand complex in the precursor solution, and a solvent for mixing the catalytic precursor and the polymer. One particular advantage of an electrospinning approach in this embodiment is the flexibility of incorporating a broader range of the catalytic precursors in the electro-spinning solution. For example, the catalytic precursors could be completely soluble in the electrospinning solution. Alternatively, they could also be present as a suspended solid. The soluble catalytic precursors include the transition metal organometallic compounds or salts that can be dissolved in the solvent, such as metalloporphyrin, metallo-phthalocyanine, metallocene, metallo-phenanthroline complexes, metal acetate, metal nitrate, and metal chloride. Some specific examples include iron porphyrin, cobalt porphyrin, iron phathlocynine, cobalt phathalocine, ferrocene, cobaltacene, 1,10-phenanthroline iron(II) perchlorate, iron acetate, cobalt acetate, manganese acetate, iron nitrate, manganese nitrate, cobalt nitrate, iron chloride, cobalt chloride, and manganese chloride. The insoluble, solid catalytic precursors include transition metal organic frameworks. Some specific examples include iron zeolitic imidazole framework (Fe-Im), cobalt zeolitic imidazole framework (Co-Im), iron zeolitic methyl-imidazole framework (Fe-mIm), cobalt zeolitic methyl-imidazole framework (Co-mIm), zinc zeolitic imidazole framework (Zn-Im), zinc zeolitic methyl-imidazole framework (Zn-mIm), and zinc zeolitic ethyl-imidazole framework (Zn-eIm). An optional nitrogen-containing organic ligand can also be added into the precursor solution to form new metal complex through metal-nitrogen ligation bond when reacts with soluble transition metal compounds. Some examples of organic ligand include bipyridine, aniline, porphyrin, phathlocynine, phenanthroline, and the like. The polymer components in the mixture include the first polymer that can form the fibrous backbone; and the optional second polymer that can generate pores during thermal activation. For example, the fibrous backbone forming polymers include polyacrylonitrile (PAN), polycarboate (PC), polybenzimidazole (PBI), polyurethanes (PU), Nylon6,6, polyaniline (PANT), polycaprolactone (PCL), and others well known in the art. The pore forming polymers include polymethylmethacrylate (PMMA), polyethylene oxide (PEO), and others well known in the art. The solvents used for the mixture preparation include those which can dissolve the soluble catalytic precursors and the polymers. Examples include dimethyl formamide (DMF), dimethylamine (DMA), N-Methyl-2-pyrrolidone (NMP), methylene chloride, methanol, ethanol, propanol, and acetone. In a preferred embodiment, the soluble catalytic precursors can include iron acetate, manganese acetate, iron porphyrin, and 1,10-phenanthroline iron(II) perchlorate; and the insoluble precursors include Zn-mIm, Zn-eIm, Fe-mIm, and Co-mIm. Also in a preferred embodiment, the fibrous backbone forming polymer includes PAN and the pore-forming polymer can include PMMA. Also in the preferred embodiment, the solvent can include DMF. All the components in the precursor mixture should first be preferably mixed uniformly together before the electro-spinning step. For the soluble catalytic precursors, the precursor and the polymers are preferably the first components to be completely dissolved by the solvent. For the insoluble catalytic precursors, the polymers are first preferably dissolved by the solvent followed by addition of the precursor. Mechanical means, such as ball-milling and blending, may be needed to break down the solid particles and to produce the mixture where the micro-particle solid can be suspended in the solution during the electro-spinning process.

Figure 2:
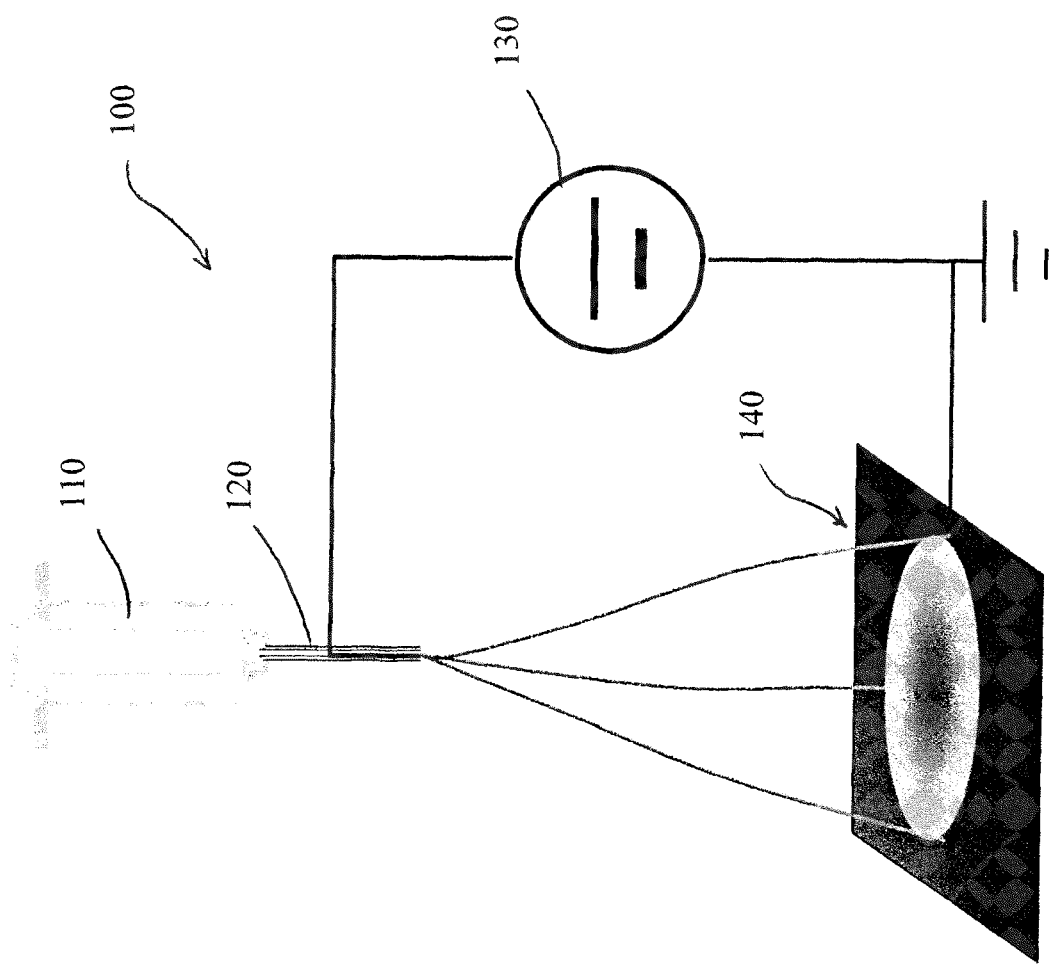
FIG. 2 shows a schematic drawing of the electro-spinning set-up for producing non-PGM electrode catalyst for PEM fuel cell and the lithium-air battery applications.

In step II, electro-spinning method is preferably used to produce nanofibers. The electro-spinning method is well known in the art, and a schematic diagram of an apparatus 100 is shown in FIG. 2. Generally, the apparatus includes a syringe pump 110 with an injection needle 120 made of electro-conductive material such as metal, a high-voltage direct current (DC) power supply 130 and a collector plate 140 made of conductive substrate such as stainless steel or carbon paper. During the electro-spinning process, a precursor solution droplet is formed at the tip of an injection needle 120 as the syringe pump 110 pushes the mixture out. Under application of high voltage, the liquid drop becomes charged and is stretched by an electric field between and needle 120 and the collector plate 140 forming a liquid jet. As the liquid jet flies from the needle 120 to the collector plate 140 under the continuous elongation, thinning and drying, the polymeric nanofiber is formed and deposited on the collector plate 140. In our preferred experimental conditions, the injection needle has the gauge size of twenty, the injection rate is generally controlled at 4 microliter/min, and the electric field is generally set at 1 kV/cm. Both carbon paper and stainless steel sheets are used as the fiber collector plates 140.

In step III, a heat treatment is used to treat the polymeric nanofibers produced from step II. The heat treatment converts the catalytic precursor to the catalytic center, converts polymeric nanofiber to graphitic nanofiber and generates micropores by decomposing pore-forming components. Not limiting the scope of the invention, the heat treatment will initiate the reaction between the catalytic precursor components in the nanofiber and leading to the formation of catalytic active sites containing nitrogen embedded in the graphitic crystallites of the nanofiber. Alternatively, the heat treatment could also convert the metal salt to metallic crystallite, which will later be converted to metal oxide supported by the nanofiber when it exposed to air. The thermal treatment will also convert the polymeric fiber to graphitic fiber therefore significantly increasing the electric conductivity which is crucial for the electrochemical reaction. In the case of PAN, for example, the polyacrylonitrile will undergo H and N elimination during the conversion to a graphitic fiber. Another benefit of heat-treatment is to produce the porosity throughout the fiber to thereby improve the interaction between the reactant and the catalytic sites inside of the fiber core. The pore forming can be achieved through either decomposition of polymer additive or vaporization of volatile solid components at elevated temperatures. In the case of a pore forming polymer, the decomposition to smaller, volatile fragments occurs through chain-scission and the porosity is generated by the escaping gaseous components under the high temperature. For example, the pore-forming polymer PMMA can be broken down to its monomer fragments during heating to produce pores throughout the nanofiber backbone. Another route of forming porosity is through the decomposition of the volatile solid component under elevated temperatures. For example, when metal organic framework Zn-mIm or Zn-eIm is used as the precursor component, the ionic Zn will be first reduced to metallic zinc before vaporizing at slightly above 900° C., leaving micropores through the body of the nanofiber. The thermal conversion of the polymeric nanofiber is generally conducted in a controlled environment, such as a sealed reactor or a flow reactor surrounded by a heating element (not shown). In a preferred embodiment, the treatment consists of two segments and is carried out inside of a tubular reactor under the constant flow of carrier gas surrounded by temperature controlled furnace. The first segment represents the thermal cure of the polymeric nanofibers. The treatment occurs usually in air or inert environment with temperature up to about 300° C., and the duration of treatment is between about one to 24 hours. In a preferred embodiment, the temperature is in the range of 150 to 200° C. with the duration of about 4 to 10 hours. Not limiting the scope of the invention, such treatment can lead to crosslinking and pore forming reaction of the polymeric media of the fiber. The second segment involves the thermal conversion at a temperature typically ranging from about 600° C. to 1100° C. In a preferred embodiment, the temperature ranges from about 700° C. to 1050° C. The time for which the sample is at the thermal conversion temperature should also preferably be controlled. According to a preferred embodiment of the invention, the thermal treatment time should also be controlled to be between about 20 minutes to 3 hours. In the most preferred embodiment, the time under the treatment of temperature should be about 20 minutes to 90 minutes. Another condition for thermal treatment that can be controlled is the chemical composition of the carrier gas. In one embodiment of the invention, the carrier gas should be inert gases such as Ar or He, or to some degree, lesser inert gases such as nitrogen. In another embodiment of the invention, the carrier gas should be reductive and containing nitrogen. The examples of such a reducing carrier gas include, but are not limited to, ammonia, pyridine, and acetonitrile. Not limiting the scope of the invention, the carrier gas containing nitrogen can also promote addition of nitrogen to the graphitic fiber during thermal treatment thus increase the number of potential active sites.

In step IV, a post treatment process is performed. After the thermal conversion process in step III, the nanofibrous material can be processed through a post-treatment step to further improve the electrocatalytic activity. According to one embodiment, a post-treatment method can be accomplished through acid washing. A variety of inorganic acids can be used to dissolve the excess amount of TM in the material from step III by simply immersing the thermally treated nanofiber in the acid solution. The acids include hydrochloric acid, sulfuric acid, nitrate acid, and other acids known to dissolve metals. The concentration of the acid can be in the range of about 0.1 molar to undiluted concentrations. In a preferred embodiment, the concentration of the acid ranges from about 0.5 molar to 2 molar. The acid treatment temperature can range from ambient to as high as about 80° C. The acid treatment time ranges from about 0.5 hour to 12 hours. In another embodiment of the current invention, the acid washed material can be further treated under elevated temperature in an inert gas flow or in a flow of nitrogen-containing gas such as ammonia under the similar temperature and carrier gas condition described in step III. Such a second thermal treatment can further improve the electrocatalytic activity. In yet another embodiment of the invention, the post-treatment involves reapplying a nitrogen-containing ligand and the transition metal organometallic compounds as described by step I to the thermally treated nanofiber produced from step III. This is then followed by another thermal treatment based on the procedure described in step III. Such a second heat treatment enables the addition of more active site to the carbon fiber and thus obtaining higher catalytic activity. In yet another embodiment of the invention, the graphitic nanofiber containing metallic crystallites from step III can be subjected to low-temperature heating in the presence of flowing air or oxygen so that the metal crystallites will be converted to metal oxide which can serve as the catalyst for LAB applications. The treatment temperature is typically from about 50° C. to 200° C.

Figure 10:
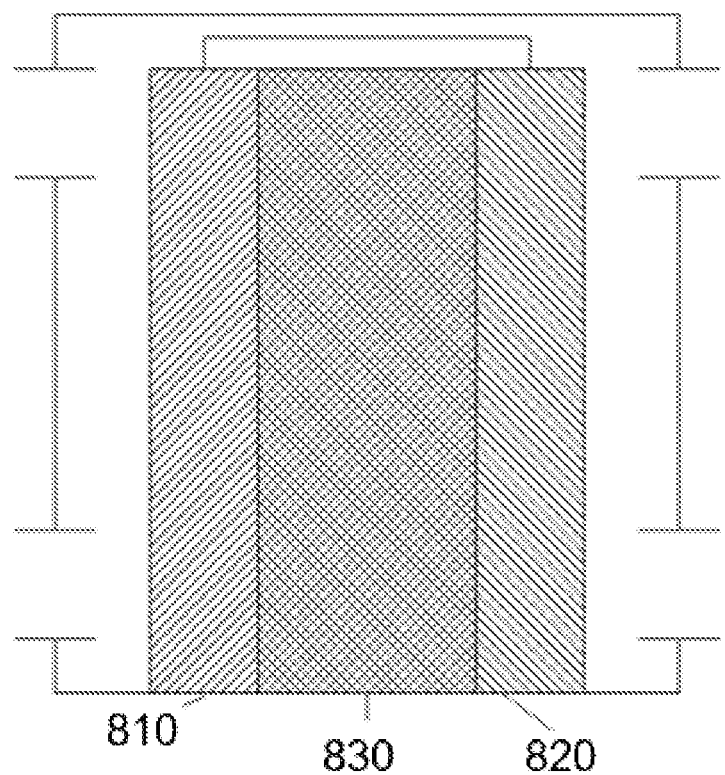
FIG. 10 shows one embodiment of a fuel cell membrane electrode assembly.

FIG. 10 shows one embodiment of a fuel cell membrane electrode assembly (MEA). The MEA includes an anode 810 and a cathode 820 with a fuel cell membrane 830 therebetween. The cathode comprises a carbon paper substrate loaded with a catalyst ink comprising an ionomer solution with catalytic powder mixed therein, the catalytic powder having a plurality of graphitic nanofibers and catalytically active metal moieties and nanopores throughout.

The process of preparing nanofibrous electrocatalyst according to the embodiments of the current invention can be further elucidated by the following non-limiting examples.

Example 1

Figure 3:
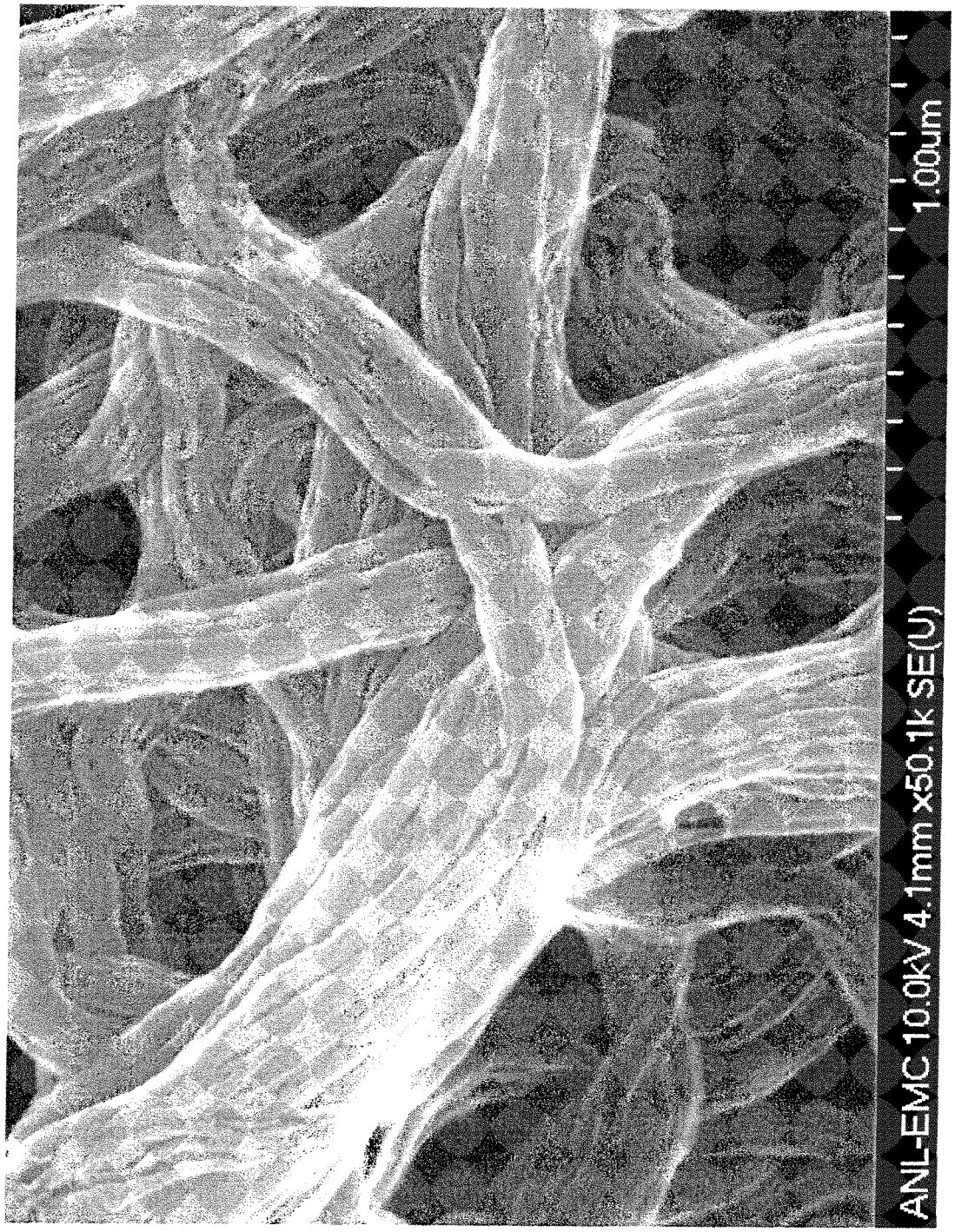
FIG. 3 shows a scanning electron microscopic image of the polymeric nanofiber according to Example 2.

A precursor solution was prepared according to the following steps: A polymer mixture of PMMA and PAN in the weight ratio of 1.5:1 was first dissolved in the excess of DMF (×8 by weight) as the solvent to form solution 1. Separately, polymer PANI was dissolved in solvent DMF in the weight ratio of 1:20 to form solution 2; and 1,10-phenanthroline iron(II) perchlorate was dissolved into DMF in the weight ratio of 1:20 to form solution 3. The solutions 1, 2 and 3 were then mixed together in the volume ratio of 5:3:1 to form the final precursor solution. The precursor solution thus formed was electrospun to the polymeric nanofibers under an applied voltage of 1 kV/cm. A representative image of the polymeric nanofiber is shown in FIG. 3. The nanofibers thus prepared were subsequently transferred to a calcination dish and subjected to the heat-treatment. The heat treatment consisted of the following steps; the sample was heated in flowing air at 200° C. for 8 hours before the second step of heating in flowing Ar at 1000° C. for one hour. The temperature was subsequently reduced to 820° C., and the sample was exposed to flowing ammonia for anther 10 minutes before retuning to the room temperature. After the heat treatment, the sample was transferred to 0.5 M $H_2SO_4$ and sonicated for 30 min to wash away the excess elemental iron. After the acid wash, the sample was dried and treated again in flowing ammonia for 20 minutes at 800° C.

Example 2

The nanofibrous catalyst prepared according to Example 1 was made into the cathode of a fuel cell membrane electrode assembly (MEA). A catalyst ink was first prepared by mixing the catalyst powder from Example 1 with a Nafion ionomer solution so that the weight ratio of the catalyst to Nafion was 1:1. The ink was subsequently sprayed over a carbon paper (5 $cm^2$, Avcarb), which was then heated under vacuum at 80° C. for 1 hour. The catalyst loading after drying was 1.8 mg $cm^{-2}$. For the anode, an ink solution containing Pt/C (20 mg, 20 wt % of Pt, BASF), Nafione (5 wt % solution, Aldrich,), ethanol and water was sonicated for 1 hour and stirred for 0.5 hour, and then sprayed onto a carbon paper (5 $cm^2$, Avcarb), which was then heated under vacuum at 80° C. for 1 hour. The Pt loading was 0.5 mg $cm^{-2}$. The prepared cathode and anode were then pre-pressed against either side of a Nafion® 211 membrane (DuPont) at 120° C. for 1 minute using a load of 500 lb. The pre-pressed assembly was then hot-pressed at 120° C. for 2 minutes using a load of 1000 lb to yield the final MEA for a single cell polarization test.

Example 3

Figure 4:
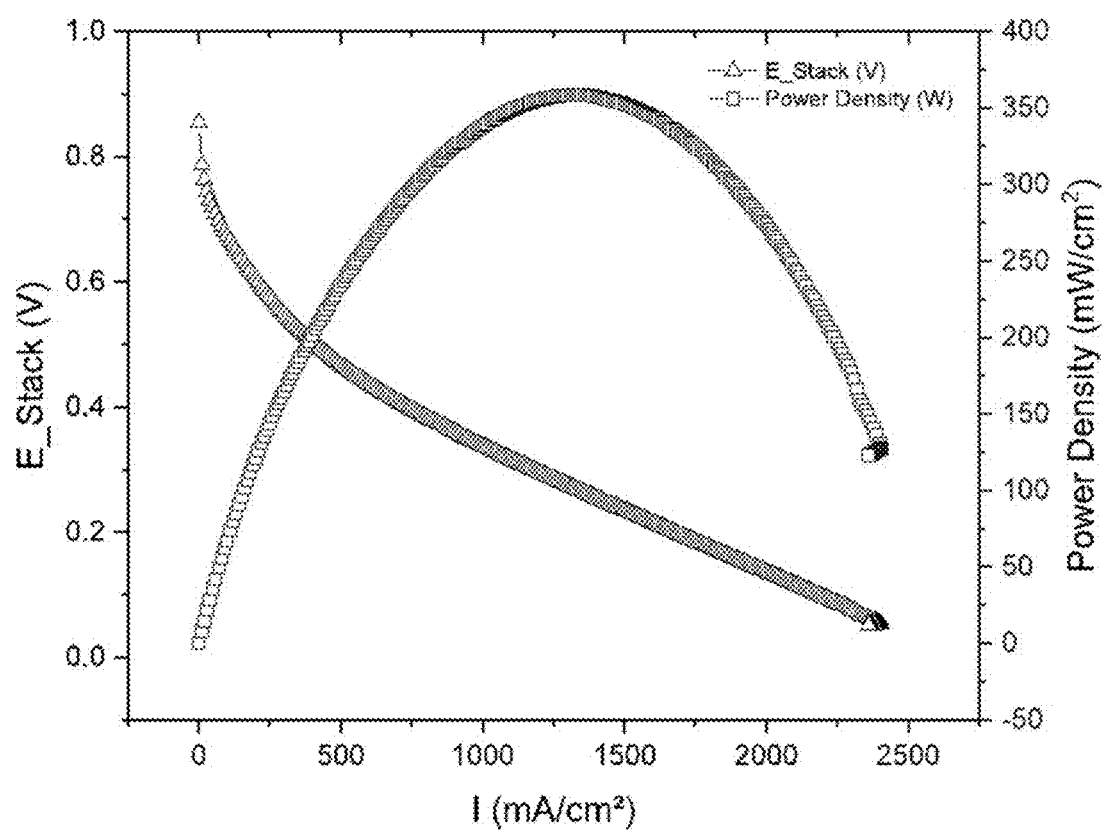
FIG. 4 shows a polarization curve of cell voltage (E_s-tack) and cell power density as the function of cell current density (I) measured according to the experiment described by Example 3.

The MEA prepared according to Example 2 was installed in a fuel cell test station (Scribner 850e), and the cell performance was evaluated. The fuel cell test was carried out using a single cell with serpentine flow channels, and a geometric electrode surface area of 5 $cm^2$. UHP grade gases were used. During the test, the cell temperature was kept at 80° C. Gases were humidified at 80° C. and were kept at a constant flow rate of 0.3 L $min^{-1}$ for $H_2$ and 0.4 L $min^{-1}$ for $O_2$, respectively. The total pressure was set at 22 psig for both anode and cathode. Shown in FIG. 4 is the polarization curve of cell voltage (E_stack) as a function of cell current density (I) and was obtained by scanning the cell current from 0 to maximum at a scan rate of 1 mA $s^{-1}$. In the same chart, the power density, which is the product of the cell voltage and current density, was also plotted.

Example 4

Figure 5:
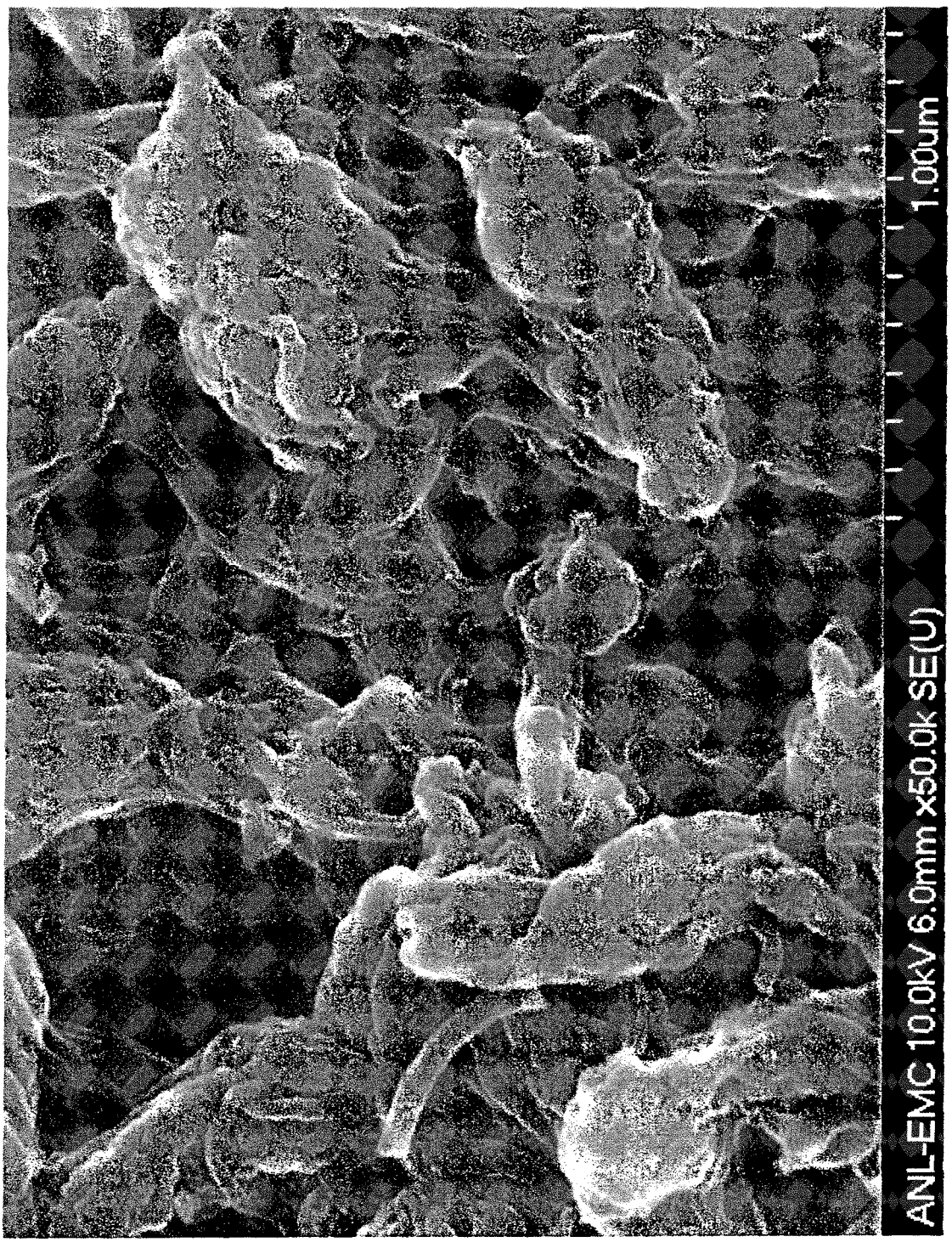
FIG. 5 shows a scanning electron microscopic image of the carbonized nanofibrous electrode catalyst obtained according to the description in Example 4.

A precursor solution was prepared according to the following steps; A polymer mixture of PMMA and PAN in the weight ratio of 1:1 was first dissolved in the excess of DMF (×16 by weight) as the solvent to form solution 1. Separately, a zinc based zeolitic imidazole framework, ZIF-8 was added as a suspended solid in DMF in the weight ratio of 1:20 to form solution 2; and 1,10-phenanthroline iron(II) perchlorate was dissolved into DMF in the weight ratio of 1:20 to form solution 3. The solutions 1, 2 and 3 were then mixed together in the volume ratio of 8:4:1 to form the final precursor solution. The precursor solution thus formed was electrospun to form the polymeric nanofibers under an applied voltage of 1 kV/cm. The nanofibers thus prepared were subsequently transferred to a calcination dish and subjected to the heat-treatment. The heat treatment consisted of the following steps: the sample was heated in flowing air at 200° C. for 8 hours before the second step of heating in flowing Ar at 1000° C. for one hour. The temperature was subsequently reduced to 900° C., and the sample was exposed to flowing ammonia for anther 10 minutes before retuning to the room temperature. After the heat treatment, the sample was transferred to 0.5 M $H_2SO_4$ and sonicated for 30 min to wash away the excess elemental iron. After the acid wash, the sample was dried and treated again in flowing ammonia for 30 minutes at 700° C. A representative image of the carbonized nanofiber is shown in FIG. 5.

Example 5

A catalyst ink was first prepared by mixing the catalyst powder from Example 4 with a Nafion ionomer solution so that the weight ratio of the catalyst to Nafion was 1:1. The ink was subsequently sprayed over a carbon paper (5 $cm^2$, Avcarb), which was then heated under vacuum at 80° C. for 1 hour. The catalyst loading after drying was 1.8 mg $cm^{-2}$. For the anode, An ink solution containing Pt/C (20 mg, 20 wt % of Pt, BASF), Nafion® (5 wt % solution, Aldrich,), ethanol, and water was sonicated for 1 hour and stirred for 0.5 hour, and then sprayed onto a carbon paper (5 $cm^2$, Avcarb), which was then heated under vacuum at 80° C. for 1 hour. The Pt loading was 0.5 mg $cm^{-2}$. The prepared cathode and anode were then pre-pressed against either side of a Nafion® 211 membrane (DuPont) at 120° C. for 1 minute using a load of 500 lb. The pre-pressed assembly was then hot-pressed at 120° C. for 2 minutes using a load of 1000 lb to yield the final MEA for the single cell polarization test.

Example 6

Figure 6:
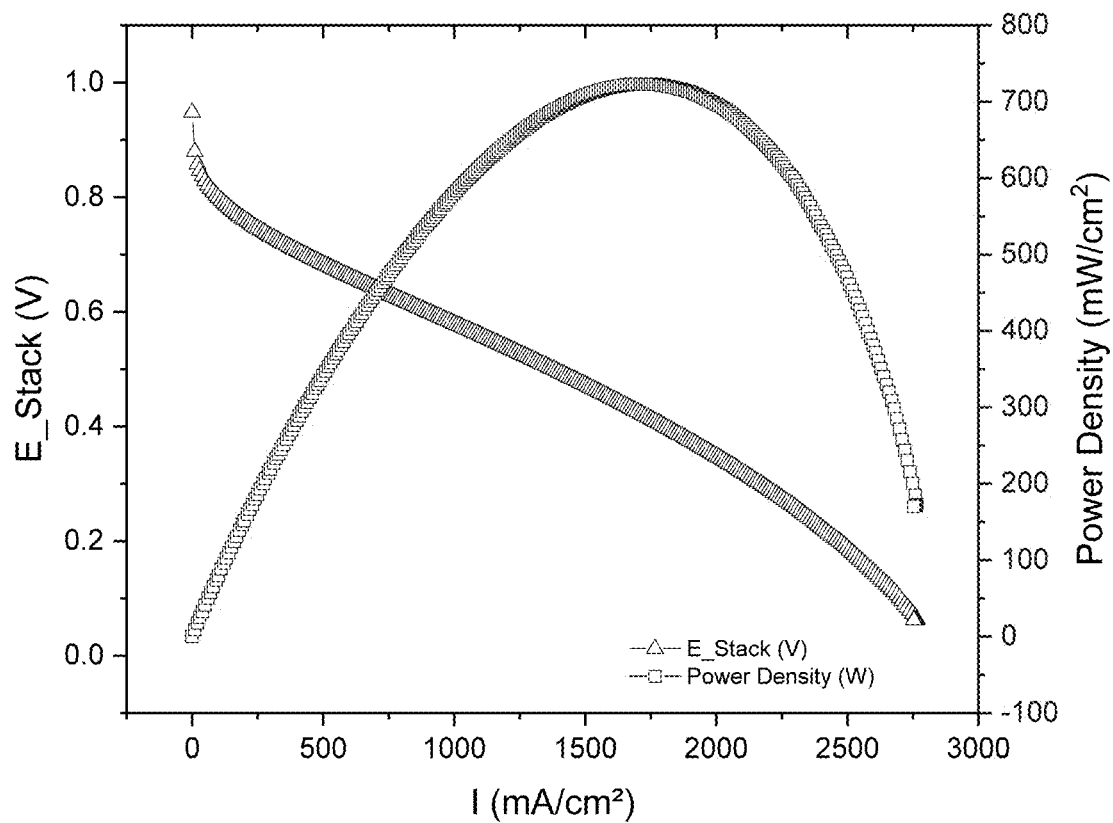
FIG. 6 shows a polarization curve of cell voltage (E_s-tack) and cell power density as the function of cell current density (I) measured according to the experiment described by Example 6.

The MEA prepared according to Example 5 was installed in a fuel cell test station (Scribner 850e) and the cell performance was evaluated. The fuel cell test was carried out using a single cell with serpentine flow channels and a geometric electrode surface area of 5 $cm^2$. UHP grade gases were used. During the test, the cell temperature was kept at 80° C. Gases were humidified at 80° C. and were kept at a constant flow rate of 0.3 L min' for $H_2$ and 0.4 L $min^{-1}$ for 02, respectively. The total pressure was set at 22 psig for both anode and cathode. Shown in FIG. 6 is the polarization curve of cell voltage (E_stack) as the function of cell current density (I) and was obtained by scanning the cell current from 0 to maximum at a scan rate of 1 mA In the same chart, the power density, which is the product of the cell voltage and current density, was also plotted.

Example 7

Figure 7:
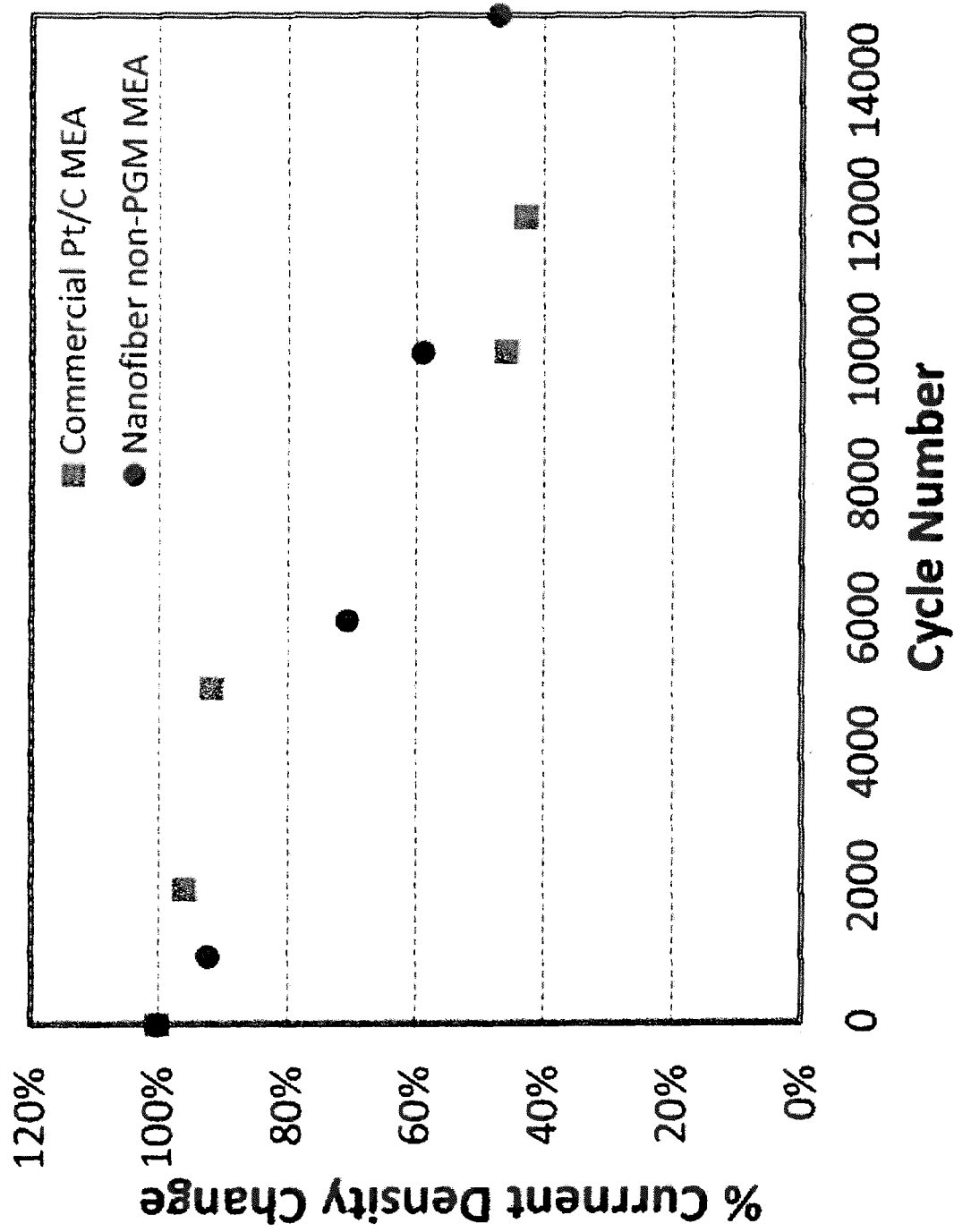
FIG. 7 shows normalized current densities (at 0.5 V) as the function of cycle number in a side-by-side comparison between a PEMFC with the nanofibrous catalyst according to the current invention and a commercial Pt/C catalyst, as described by the description in Example 7.

An MEA prepared in a similar method according to Example 5 was tested side-by-side with a commercial Pt based MEA (BASF, P.O. 9A-31427). Both MEAs were installed in single cell test assemblies and subjected to the multiple cycling aging test. The cycling condition included flowing 4% $H_2$ in He at anode and nitrogen at cathode and both were humidified at 80° C. and kept at a constant flow rate of 0.2 L $min^{-1}$. Shown in FIG. 7 are the normalized current densities (at 0.5 V) for both cells tested intermittently during the multicycle aging. As one can see, the normalized current density of the MEA with nanofibrous non-PGM cathode decayed slower than that of commercial Pt MEA up to 15000 cycles.

Example 8

Figure 8:
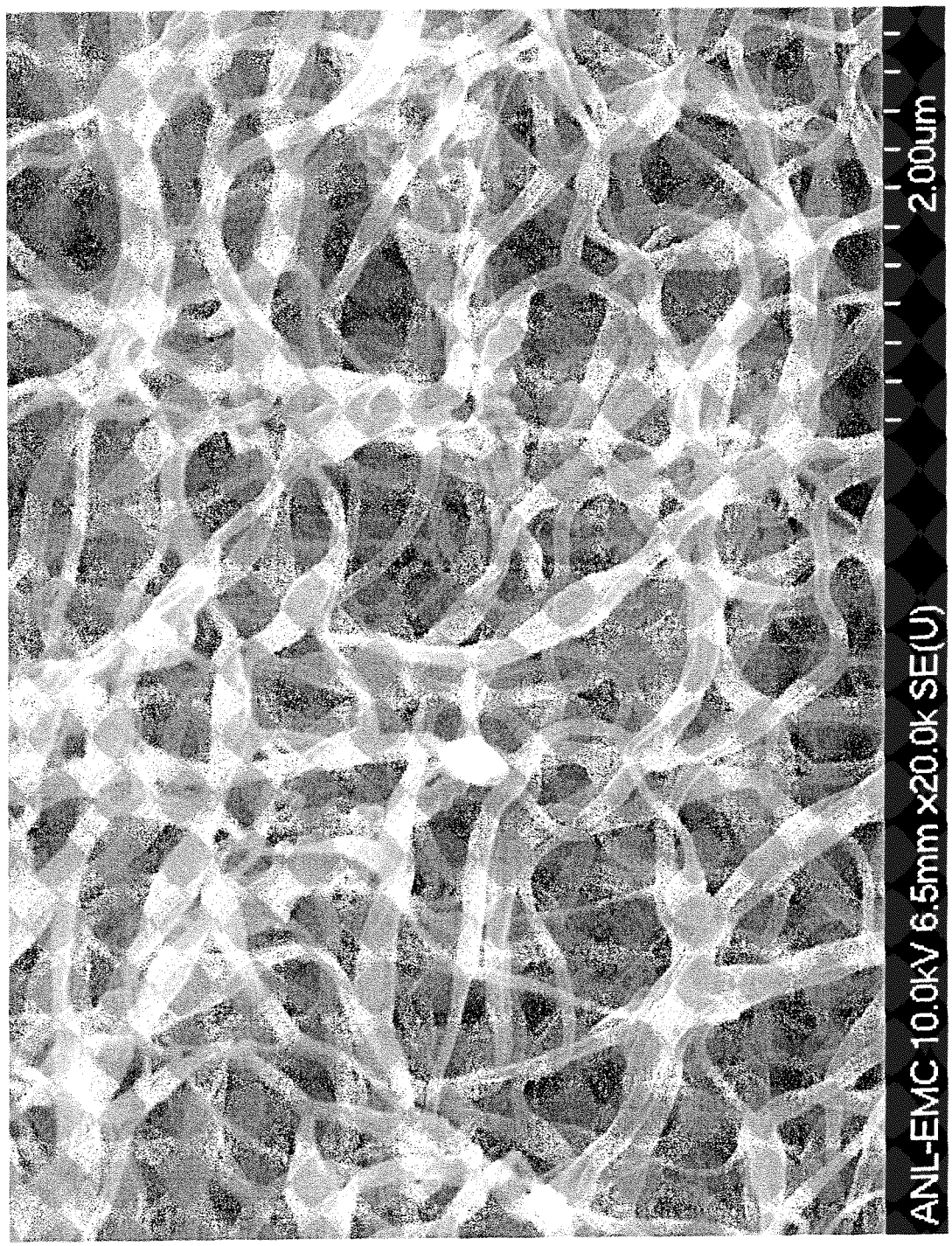
FIG. 8 shows a scanning electron microscopic image of the carbonized nanofibrous electrode catalyst obtained according to the description in Example 8.

A precursor solution was prepared according to the following steps; A polymer mixture of PMMA and PAN in the weight ratio of 1:3 was first dissolved in the excess of DMF (×16 by weight) as the solvent to form solution 1. Separately, a zinc based zeolitic imidazole framework, ZIF-8 was added as the suspended solid in DMF in the weight ratio of 1:20 to form solution 2; and 1,10-phenanthroline iron(II) perchlorate was dissolved into the DMF in the weight ratio of 1:20 to form solution 3. The solutions 1, 2 and 3 were then mixed together in the volume ratio of 13:5:1 to form the final precursor solution. The precursor solution thus formed was electrospun to form the polymeric nanofibers under the applied voltage of 1 kV/cm. The nanofibers thus prepared were subsequently transferred to a calcination dish and subjected to the heat-treatment. The heat treatment consisted of the following steps; the sample was heated in flowing air at 200° C. for 8 hours before the second step of heating in flowing Ar at 1000° C. for one hour. The temperature was subsequently reduced to 900° C., and the sample was exposed to flowing ammonia for another 10 minutes before returning to the room temperature. The SEM image of nanofibers thus prepared is shown in FIG. 8.

Example 9

Figure 9:
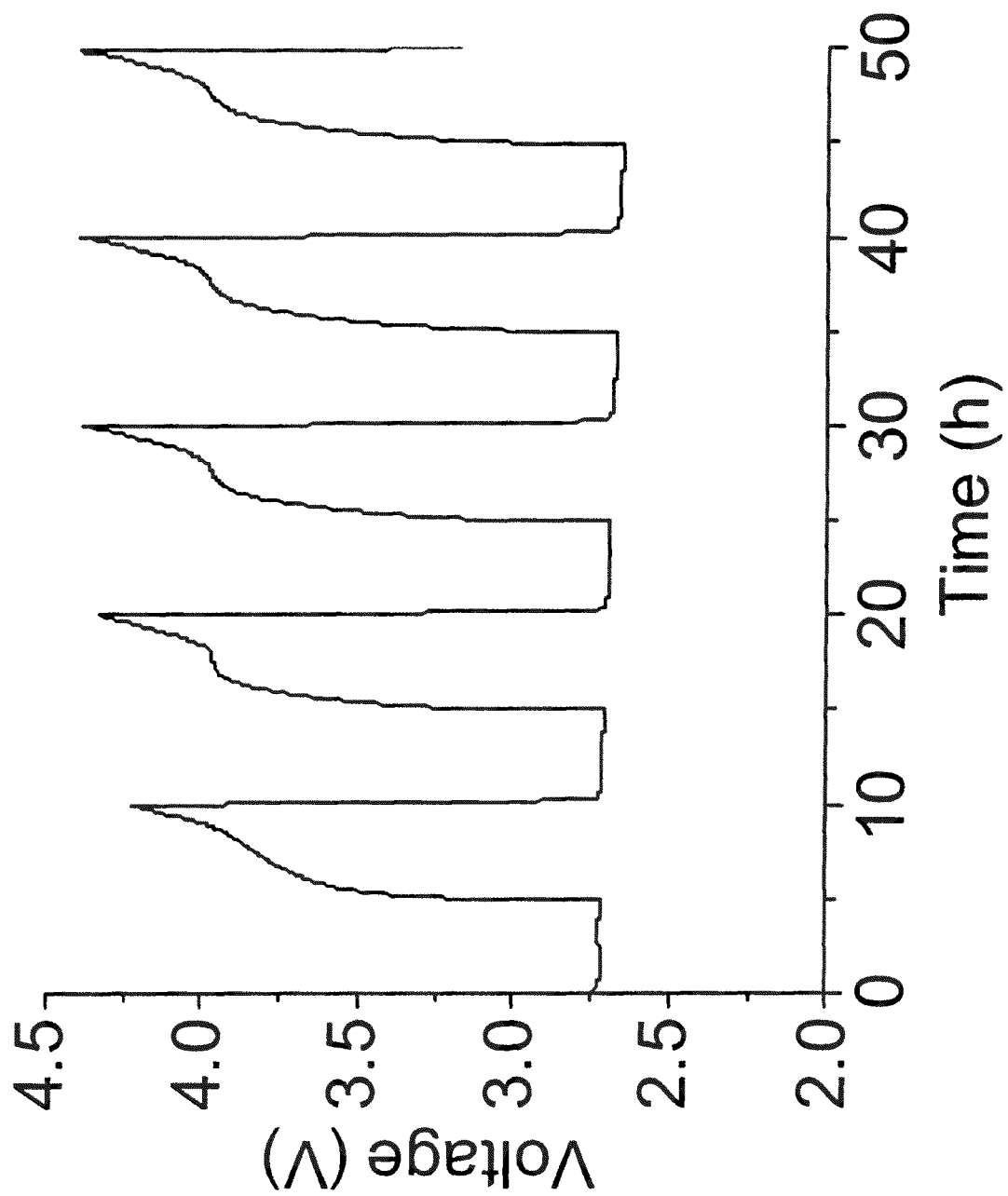
FIG. 9 shows the cell voltage as the function time in a multiple cycle discharge-charge test of a lithium-$O_2$ battery using nonfibrous cathode according to Example 9.

The nanofibrous cathode catalyst prepared according to Example 8 was fabricated into a LAB cathode. Two pieces of catalyst films with diameter of 7/16" were used as cathode. The loading of catalysts and carbons were between 0.6 mg. Li foil was used as the anode, and a circular porous glass fiber filter (Whatman, ½" in diameter) was used as the separator. Electrolyte was 1 M $LiCF_3SO_3$ (99.995% pure) in tetraethylene glycol dimethyl ether (TEGDME) (Aldrich). $LiCF_3SO_3$ was dried in vacuum oven in a glovebox before using. Analytical grade TEGDME was treated by distillation and molecular sieve before using. Both electrodes and the separator were stacked into a half inch Swagelok union, which was placed inside of a sealed glass cell. For a cycling test, the glass cell was filled with oxygen accessible to the cathode layer through an open-end connector. The discharge/charge cycling was controlled by a MACCOR system under a constant current of 0.05 mA with limited duration of 5 hours for single discharge and charge. Cut-off voltage limits were 2.3 V for discharge and 4.4 V for charge. FIG. 9 shows the cell voltage as the function of time in a multiple cycle discharge-charge cell test.

The electrode catalysts prepared in accordance with the method of the invention have several advantages over that of prior art in the following aspects, including improved mass transfer and humidity management. The preferred nanofibrous catalyst according to the current invention contains selected levels of micro-, meso- and macropores in its architecture. Compared with amorphous carbon structures reported by the prior art, the instant nanofibrous morphology enables efficient transfer of gas reactants to the entire thickness of the cathode layer, which thereby improves the catalyst site utilization through better interaction with the oxygen in both PEMFC and LAB. In PEMFC, water is produced through the reaction between the proton and the reduced oxygen. Effective removal of additional water is critical for stable fuel cell operation since the cathode surface can be flooded by the excess of moisture, which is often observed in the case of an amorphous carbon structure used in the prior art. Unlike the prior art, the instant nanofibrous catalyst structure according to the current invention, however, has high porosity and connectivity between different pores which therefore can mitigate water built-up by the effective penetration of cathode gas flow at all thickness level.

The nanofibrous catalyst has other advantages, including two intrinsic advantages in catalyst stability. As previously described, the backbone of the nanofibrous catalyst is a graphitic fiber produced by carbonizing a polymer over a temperature preferably of about 1000° C. Graphitic fiber is known to be significantly more tolerant than amorphous carbon to the oxidative environment in the PEMFC or LAB cathode. Therefore, it can better preserve the electrode integrity under corrosive conditions. The graphitic skin of the nanofiber also provides a protective layer over the catalytic active site and hence can extend the cathode durability. Furthermore, the nanofibrous catalyst has a smooth fiber curvature with a diameter in the tens to hundreds of nanometers. Such large and smooth curvature is more resistant to the oxidative corrosion than that of amorphous carbons of smaller particle size with highly reactive unsaturated or oxidized edges.

Other advantageous features include the nanofibrous catalyst having a form of continuous, interconnected graphitic fibrous framework, and thus it offers significantly better electronic and thermal conductivity than known amorphous counterparts which conduct electron/heat through percolation between individual carbon particles. Such percolation in known systems can be easily interrupted when carbon particles shrink their dimensions by oxidative loss. On the contrary, the connectivity of the nanofibers will not be significantly affected even if the fiber diameter is reduced slightly by oxidation.

In another advantageous aspect, the method and system described herein offers significantly greater flexibility over known catalysts by using a variety of precursors to incorporate the catalytic active sites. Unlike the carbon nanotube in which the active center is formed through the chemical vapor deposition technique with only limited transition metal and nitrogen-containing precursors, the method herein for manufacture and the resulting article can integrate numerous different precursors, either soluble or insoluble by the solvent, into the precursor mixture before converting them into nanofibers. The metal or N-containing precursors do not need to be vaporized to form the nanofiber catalyst. Therefore, the current method and article of manufacture has the advantage of using a broad selection of the catalytic precursor with more flexibility in catalyst design and resulting activity improvement.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. An article of manufacture of a catalyst, comprising:
    a nanofibrous continuous network of graphitic nanofibers having catalytically active metal moieties embedded within the graphitic nanofibers and the graphitic nanofibers having a matrix of interconnected nanopores exposing the catalytically active metal moieties,
    wherein a graphitic skin of the graphitic nanofibers provides a protective layer over the catalytically active metal moieties embedded within the graphitic nanofibers.

2. The article of manufacture as defined in claim 1, wherein the catalyst forms a component selected from the group of a cathode in PEMFC membrane electrode assembly and a cathode of a lithium air battery.

3. The article of manufacture as defined in claim 1, wherein the metal moieties originate from a precursor having composition comprising transition metal zeolitic imidazolate frameworks comprising iron zeolitic imidazole framework (Fe-Im), cobalt zeolitic imidazole framework (Co-Im), iron zeolitic methylimidazole framework (Fe-mIm), cobalt zeolitic methylimidazole framework (Co-mIm), zinc zeolitic imidazole framework (Zn-Im), zinc zeolitic methylimidazole framework (Zn-mIm), or zinc zeolitic ethylimidazole framework (Zn-eIm).

4. The article of manufacture of claim 1, wherein the catalytically active metal moieties comprise catalytically active transition metal, nitrogen and carbon moieties.

5. The article of manufacture of claim 1, wherein the catalytically active metal moieties comprise catalytically active metal oxide compound crystallites.

6. The article of manufacture as defined in claim 1, wherein the graphitic nanofibers have a diameter of about ten nanometers to one thousand nanometers.

7. The article of manufacture of claim 1, wherein the graphitic nanofibers comprise a thermally carbonized backbone forming polymer and a carbonized pore forming polymer.

8. The article of manufacture of claim 7, wherein the backbone forming polymer is carbonized to graphitic form.

9. The article of manufacture of claim 8, wherein the graphitic nanofibers have crosslinking therebetween.

10. A cathode comprising:
    a carbon paper substrate; and
    a dried catalyst ink comprising a plurality of graphitic nanofibers having catalytically active metal moieties embedded within the graphitic nanofibers and the graphitic nanofibers having a matrix of interconnected nanopores throughout exposing the catalytically active metal moieties,
    wherein the dried catalyst ink is disposed on the carbon paper substrate,
    wherein a graphitic skin of the graphitic nanofibers provides a protective layer over the catalytically active metal moieties embedded within the graphitic nanofibers.

11. The cathode of claim 10, wherein the catalytically active metal moieties comprise catalytically active transition metal, nitrogen and carbon moieties.

12. The cathode of claim 10, wherein the catalytically active metal moieties comprise catalytically active metal oxide compound crystallites.

13. The cathode of claim 10, wherein the graphitic nanofibers comprise a thermally carbonized backbone forming polymer and a carbonized pore forming polymer.

14. The cathode of claim 10, wherein the graphitic nanofibers have crosslinking therebetween.

15. A fuel cell membrane electrode assembly comprising:
    an anode;
    a cathode comprising:
        a carbon paper substrate; and
        a dried catalyst ink comprising a catalytic powder having a plurality of graphitic nanofibers and catalytically active metal moieties embedded within the graphitic nanofibers and the graphitic nanofibers having a matrix of interconnected nanopores exposing the catalytically active metal moieties, and a fuel cell membrane having the anode and cathode pressed into the fuel cell membrane, wherein a graphitic skin of the graphitic nanofibers provides a protective layer over the catalytically active metal moieties embedded within the graphitic nanofibers.

16. The fuel cell membrane electrode assembly of claim 15, wherein the catalyst ink has a dry catalyst loading of 1.8 mg/cm$^2$ on the carbon paper substrate.

17. The fuel cell membrane electrode assembly of claim 15, wherein the catalytically active metal moieties comprise catalytically active transition metal, nitrogen and carbon.

18. The fuel cell membrane electrode assembly of claim 15, wherein the catalytically active metal compound crystallites comprise catalytically active metal oxide compound crystallites.

19. The fuel cell membrane electrode assembly of claim 15, wherein the graphitic nanofibers comprise a thermally carbonized backbone forming polymer and a carbonized pore forming polymer.

\* \* \* \* \*